US008737172B2

(12) United States Patent
Kurpiewski

(10) Patent No.: US 8,737,172 B2
(45) Date of Patent: May 27, 2014

(54) HULL MOUNTED LINEAR SONAR ARRAY

(75) Inventor: Thaddeus J. Kurpiewski, Ambler, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 356 days.

(21) Appl. No.: 12/850,431

(22) Filed: Aug. 4, 2010

(65) Prior Publication Data

US 2012/0113757 A1 May 10, 2012

(51) Int. Cl.

*G01V 1/16* (2006.01)
*G01K 11/00* (2006.01)
*H04B 17/00* (2006.01)

(52) U.S. Cl.

USPC .............. 367/188; 367/173; 367/165; 367/13

(58) Field of Classification Search

USPC ............................ 367/188, 173, 165, 13, 901
See application file for complete search history.

(56) References Cited

U.S. PATENT DOCUMENTS 2,019,497 A * 11/1935 Kuntze .......................... 181/142
3,594,718 A * 7/1971 Black et al. ................... 367/125
3,731,264 A * 5/1973 Campbell et al. ............... 367/12
3,939,466 A 2/1976 Horwath
4,090,168 A 5/1978 Miller et al.
4,594,695 A * 6/1986 Garconnat et al. ............ 367/135
4,733,379 A 3/1988 Lapetina et al.
4,907,208 A 3/1990 Lowrance et al.
5,109,364 A 4/1992 Stiner
5,220,535 A 6/1993 Brigham et al.
5,504,716 A * 4/1996 Cotterill ......................... 367/121
5,697,319 A 12/1997 Steensland et al.
6,370,085 B1 4/2002 Finkle et al.
7,139,221 B1 * 11/2006 Carter et al. .................. 367/125
7,289,391 B2 10/2007 Tietjen et al.
7,535,801 B1 5/2009 Porzio
8,111,581 B1 * 2/2012 Donaldson et al. ............. 367/13

FOREIGN PATENT DOCUMENTS

EP 214525 A1 * 3/1987 ............... B63G 8/39

* cited by examiner

*Primary Examiner* — Cassie Galt
(74) *Attorney, Agent, or Firm* — Howard IP Law Group, PC

(57) ABSTRACT

A hull-mounted sonar array is provided. The array comprises a linear arrangement of hydrophones disposed within a generally D-shaped housing. The D-shaped housing comprises a generally flat portion having a first and second end and a curved portion extending from the first end to the second end. The hydrophones are arranged along the generally flat portion of the housing, equidistant from the curved portion. The housing is mounted to the hull of a vessel by, for example, a marine adhesive.

19 Claims, 5 Drawing Sheets

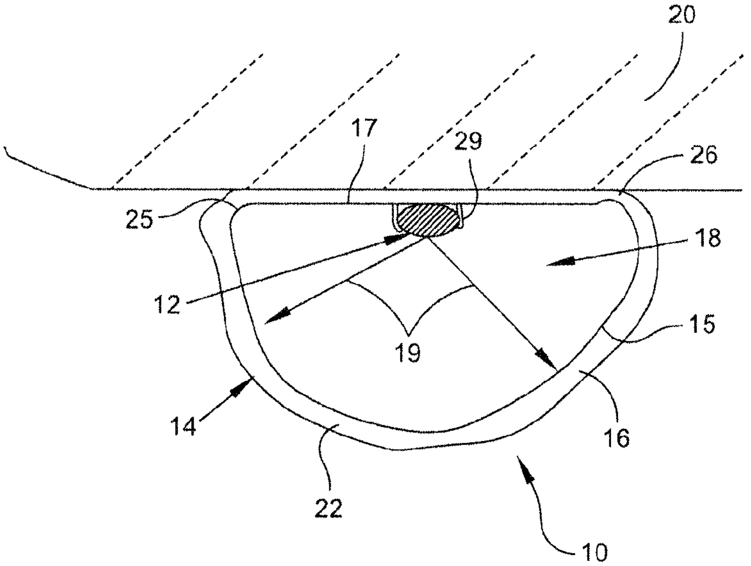
FIG. 1
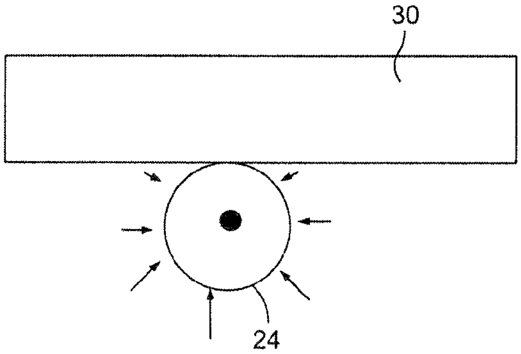
FIG. 2a
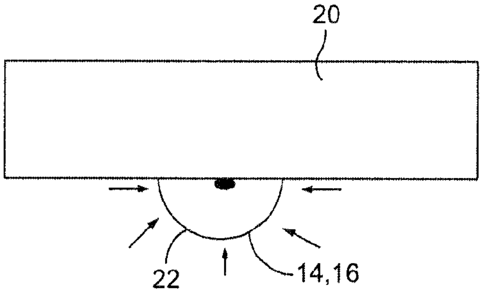
FIG. 2b
FIG. 2

HULL MOUNTED LINEAR SONAR ARRAY

FIELD OF INVENTION

The present invention relates in general to sonar arrays, more particularly, to hull-mounted, linear sonar arrays.

BACKGROUND

Civilian and military sea vessels use both active and passive sonar systems for numerous purposes including geological studies, marine life exploration, and military operations such as anti-submarine warfare (ASW). These systems are used to detect the presence of submerged objects by either transmitting a sound wave and detecting its reflection as it propagates through the water (active sonar) or by listening for sound waves generated by these objects (passive sonar).

These systems generally utilize sonar transducers, for example, hydrophones in conjunction with sound receiving and signal processing electronics to detect the presence of a submerged object. A database of known sonic frequencies is often used to aid in the target identification process. For example, in the case of military operations, vessels may be identified by the unique noises generated by their propulsion systems, or by the distinct operating frequencies of their AC power systems.

The use of passive sonar systems may be advantageous over active systems, as passive systems are "silent" in operation. Specifically, a host vessel's location is not reveled by the use of passive sonar systems, whereas the transmission of a sound wave (a "ping") by an active sonar system, while potentially providing range and bearing information of a target, also greatly increases the ability of other vessels to detect these pings, and thus the presence and/or location of a searching vessel. Accordingly, passive sonar is particularly useful in military operations, such as ASW, where undetected operation is of critical importance.

A drawback of passive sonar, however, is that it is subject to interference, particularly by noise emitted from the host vessel. For example, noise from the vessel's propulsion system may negatively impact the operation of a passive system. This is especially true in the case of hull-mounted arrays, where hull-born vibrations and other noises are transferred directly to the sonar transducers. In order to locate the array further from the vessel's noise-producing components, and thus reduce interference, sonar arrays are often towed behind vessels.

These towed arrays generally comprise hydrophone arrangements that are typically deployed and recovered through openings in the hull of the vessel below the water line. Thus, if the vessel is not originally constructed with this type of arrangement, the vessel must be dry docked and a portion of the hull removed in order to be retrofitted with the system. In the case of larger arrays, or cases where a hull-opening is not a preferred option, the towed array is often deployed and recovered over the gunwale of the ship using, for example, a winch and boom arrangement. This handling equipment occupies a large amount of deck space in addition to presenting a large target cross-section to enemy radar. Thus, these arrangements limit covert deployment and recovery. Deployment and recovery is also time consuming, expensive, and difficult in high seas.

Moreover, towed arrays can often not be deployed in shallow waters. This is an increasing problem as military and civilian vessels are beginning to operation in these more littoral waters. Towed arrays also negatively impact the maneuverability of a vessel, hindering, for example, "sprint-drift" and "sprint-stop" detection maneuvers, as well as the speed and mobility of a vessel in general when towing the array. Towed arrays are subject to various types of flow-noise, such as turbulent boundary layer (TBL) noise, extensional wave noise generated by strengthening or stiffening members typically utilized in the towed arrays, and breathing wave noise produced by the movement of fluid or flexible fill used within the hydrophone arrangements.

In the case of hull-mounted arrays, the same types of installation challenges exist. Specifically, installing these systems typically involves disposing a small sonar array on the hull of a vessel, such as on the bow, which normally requires cutting out a section of the hull and reinforcing it to maintain adequate seaworthiness. Accordingly, unless originally fitted to the vessel, these procedures require dry-docking and significant time out of service. As these installations are extremely expensive, they are not often performed on small vessels, including small non-military vessels.

Accordingly, it would be advantageous to have a hull, or surface-mounted passive sonar system which can easily and cost-effectively be retrofitted to existing vessels of all sizes, for both military and civilian uses. It would also be advantageous to provide a hull-mounted sonar system which does not hinder the operation of the vessel during, for example, tight maneuvering, especially in shallow waters.

SUMMARY OF THE INVENTION

According to an embodiment of the present invention, a linear, hull-mounted sonar array is provided. The array includes at least one receiving element arranged within a housing. In a preferred embodiment, the housing comprises a generally D-shaped cross-section, and is arranged longitudinally along the length of a vessel hull. The D-shaped cross-section comprises a substantially straight portion, having a first and a second end, attached to a portion of the hull. The first and seconds ends are connected by a curved or arching portion exposed to the water. The D-shaped housing may comprise a retaining portion formed on the substantially straight portion, the retaining portion is configured to retain the at least one receiving element within the housing.

In one embodiment, at least one of the above-described sonar arrays is mounted to the center keel of a vessel, running generally longitudinally with respect to the length of the hull. In another embodiment, two or more sonar arrays may be mounted to the vessel's hull, providing increased sonar coverage, as well as the ability to perform noise-cancelling operations between the received signals from each array.

According to yet another embodiment of the present invention, a method for fitting a sonar system to an existing vessel is provided. The method comprises the steps of forming a housing having a D-shaped cross-section, disposing at least one receiving element, such as a hydrophone, within the housing such that the hydrophone is located on a substantially flat portion of the D-shaped housing equidistant from a curved portion of the housing, and mounting the housing to the hull of the vessel, by, for example, an adhesive.

BRIEF DESCRIPTION OF THE DRAWINGS

FIG. 1 is a cross-sectional view of a linear sonar array mounted to the keel of a vessel according to an embodiment of the present invention.

FIGS. 2*a* and 2*b* are a cross-sectional views showing the advantageous mounting arrangement of the array of the present invention.

DETAILED DESCRIPTION

Figure 3:
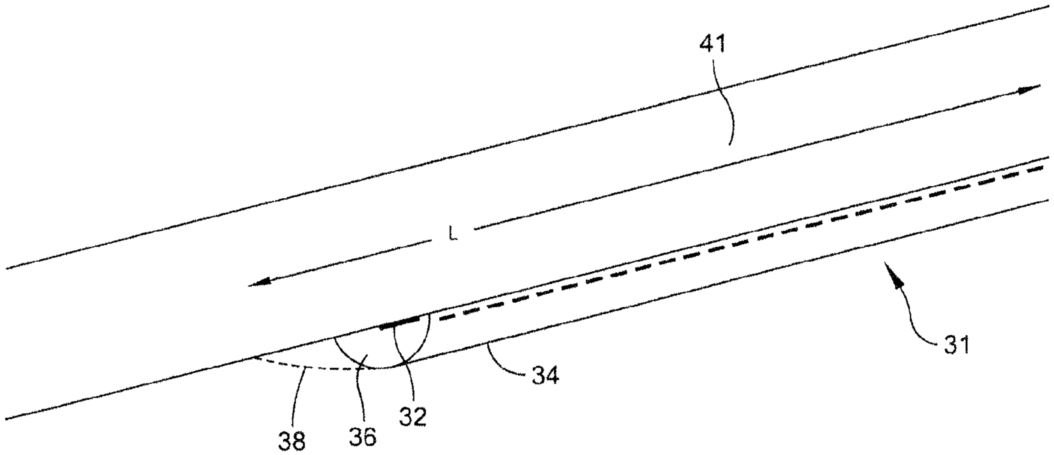
FIG. 3 is a perspective view of the embodiment of the present invention shown in FIGS. 1*a* and 2*b*.

It is to be understood that the figures and descriptions of the present invention have been simplified to illustrate elements that are relevant for a clear understanding of the present invention, while eliminating, for purposes of clarity, many other elements found in typical sonar systems, such as passive sonar array arrangements. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Referring generally to FIG. 1, a cross-sectional view of a hull-mounted sonar system 10 accordingly to an embodiment of the present invention is provided. The system 10 may include, for example, one or more receiving elements, such as hydrophones 12. The hydrophones 12 may comprise transducers, such as piezoelectric-based transducers, as are commonly used in sonar applications. In a preferred embodiment, the hydrophones 12 are arranged linearly within a housing 14 (see FIG. 3). The housing 14 may be a hose-like structure having an outer wall 16 that defines an inner cavity 18 in which the hydrophones 12 are disposed.

In a preferred embodiment, the outer wall 16 has a D-shaped cross-section. The D-shaped cross-section is defined by a substantially flat portion 17 having first and second ends 25,26, and a substantially curved or arching portion 22 connecting these first and second ends 25,26 of the flat portion 17. Advantageously, this configuration allows for the flat portion 17 to be mounted against the hull or keel of a vessel 20, and the curved portion 22 exposed to the water medium. In this way, a maximum and uniform attachment area is provided between the flat portion 17 and the hull 20. Further, the surface area of the housing 14 which is subject to turbulent barrier layer (TBL) noise (noise created between the moving water and the housing wall 16) is minimized. This reduced exposure to noise is important to the operation of the system. For example, as shown in FIG. 2*a*, a circular housing 24, for example, provides minimal surface area for attachment to the vessel 30, and almost all of the perimeter of housing 24 is exposed to the water medium (indicated by the arrows), creating more TBL noise. This arrangement is distinct from that of FIGS. 1 and 2*b*, wherein exposure of the outer wall 16 of the housing 14 to TBL noise is minimized to only the curved portion 22, and a maximum surface area for mounting the housing 14 to the hull 20 is provided.

Still referring to FIG. 1, the hydrophones 12 are preferably arranged approximately midway along the length of the flat portion 17 within the inner cavity 18. This provides a relatively equal distance 19 between the hydrophones 12 and the curved portion 22 of the housing outer wall 16. As this arrangement maximizes and equalizes the distance 19 of the hydrophones 12 from the housing wall 16 that is opposite the water medium, TBL noise created between the housing wall 16 and the water acts uniformly on the hydrophones 12. In an exemplary embodiment, the distance between the hydrophones 12 and the housing wall 16 is approximately one-eighth of the wavelength of the received signal. Moreover, as the hull-mounted arrangement is not towed, there would be no need for strength members arranged within the array. Thus, no extensional waves would be produced, further minimizing noise. Further still, as the array would not be wrapped around a winch, the interior cavity 18 could comprise a solid fill, thus eliminating the noise created by breathing waves often created by liquid fills.

In another embodiment of the present invention, the wall 16 of the housing 14 may comprise attachment means 29 disposed thereon configured to secure the hydrophones 12. The attachment means 29 may take the form of a clip or an enclosure in which the hydrophones 12 may be pressed or inserted. In this way, precise positioning of the hydrophones 12 in the above-described location within the cavity 18 can be achieved. In other embodiments, the hydrophones 12 may be secured within the cavity 18 by, for example, an adhesive or other suitable form of mechanical fastener.

The housing 14 may comprise a flexible material, by way of example only, plastic, rubber, other polymers, or composites. The housing 14 should possess significant "acoustic transparency". An acoustically transparent material is one in which the velocity of sound waves propagating therethrough is similar to the velocity of the sound waves in water. In this way, sound waves are not distorted, blocked, of otherwise affected by the housing, and thus do not reduce the performance of the sonar system. In order to aid wave propagation through the inner cavity 18, the housing 14 may be filled with a suitable liquid, such Isopar®, gel, or solid. In addition to possessing ideal sound propagation characteristics, in the case of towed arrays, these fluids typically were required to have neutral-buoyancy characteristics for ideal performance. However, as the arrays are mounted to the hull of a ship along their entire length, and thus are not arranged unsupported in the water, such a requirement is not necessary in the array of the present invention. Further, as described above, the use of a solid fill may eliminate the production of interference causing breathing waves.

The housing 14 may be pre-formed, such as by an extrusion process, or any other suitable method. In the case of a housing

14 formed by extrusion, features such as the attachment means 29 may be formed simultaneously with the housing 14. It is further envisioned that the housing 14 may comprise a generally flexible circular or oval-shaped housing which may be deformed into the D-shaped cross-section when mounted to a vessel. This flexible configuration may also be advantageous when mounting the arrangement to a portion of the hull or keel of a vessel which is not uniform or flat, and thus not complimentary to the flat portion 17 of the D-shaped housing 14. Thus, the housing 14 may be able to deform into a complimentary shape to that of the corresponding mounting surface on the hull or keel, maximizing the contact array used for attaching the housing 14 to the vessel.

In one embodiment of the present invention, the housing 14 is attached to the hull of the vessel using an adhesive that can be applied under water, for example, a marine epoxy. In this way, the array of the present invention can be quickly and cost-effectively mounted by, for example, divers, without the need to dry-dock the vessel. It is also envisioned that the housing 14 may be attached to the hull of a vessel by other suitable means, for example, mechanical fasteners such as brackets arranged along the length of the hull. In either case, this mounting can be accomplished with minimal downtime and expense. With respect to the electronics used in conjunction with the array arrangement, it is envisioned that either an externally mounted sea-chest may be provided, or a small hull penetrator may be utilized to run the necessary connections to on-board control equipment. According, retrofitting the system of the present invention to a vessel is substantially less time-intensive and more cost effective than existing hull-mounted systems.

Referring generally to FIG. 3, a sonar array 31 of the present invention is shown mounted to the keel 41 of a vessel. The array 31 comprises a generally linear shape that extends longitudinally down a length L of the keel 41. This length may vary according to the number of hydrophones 32 used which may be dictated by numerous factors, including desired sonar coverage, expense, available suitable keel or hull mounting surfaces, in addition to host vessel noise considerations. For example, in order to reduce ambient noise and interference, the array 31 may be mounted away from noise-producing components of the vessel, such as the engine room. The hull-mounted arrangement of the present invention is further advantageous in that it does not block the range of sonar coverage, which is the case with front or bow-mounted units. Further, the low profile, low drag, cross-section presents no radar or sonar target itself, as is the case with deck-stored arrays.

Figure 4A:
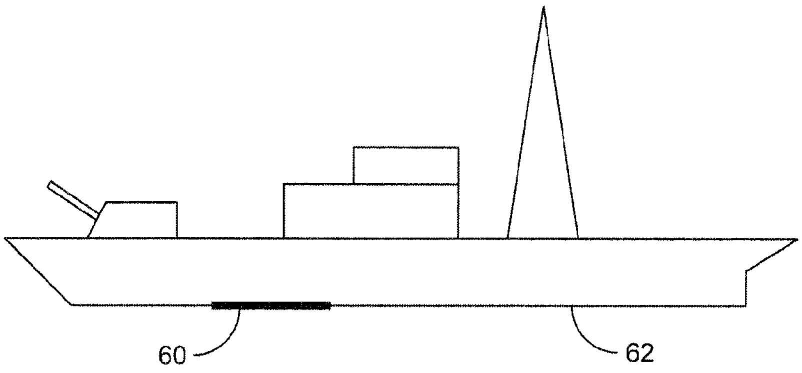
FIGS. 4*a* and 4*b* are side and bottom views respectively of a single-array installation according to an embodiment of the present invention.
Figure 4B:
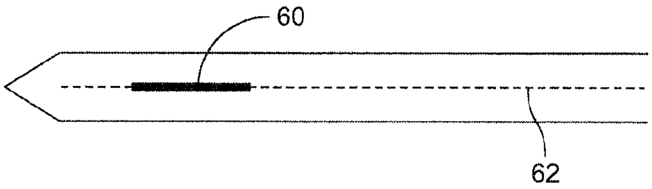

The illustrated embodiment of FIG. 3 comprises a similar arrangement to that described above with respect to FIG. 1, specifically the center mounted hydrophones 32 are located within a cavity 36 formed by the D-shaped housing 34 of the array 31. The arrangement may further include a hydrodynamic fairing 38 arranged on a leading end of the array 31. This fairing 38 reduces hydrodynamic drag and turbulence created by the array 31 as it moves through water. Moreover, a similar hydrodynamic fairing may be used at a second, trailing end of the array 31 (not shown), so as to promote continuous and smooth flow of water the entire length of the array 31, thus reducing overall turbulence and noise. A similar single-array installation can also be seen in FIGS. 4*a* and 4*b*, wherein the array 60 is mounted along the center of the vessel's hull or keel 62.

Figure 5A:
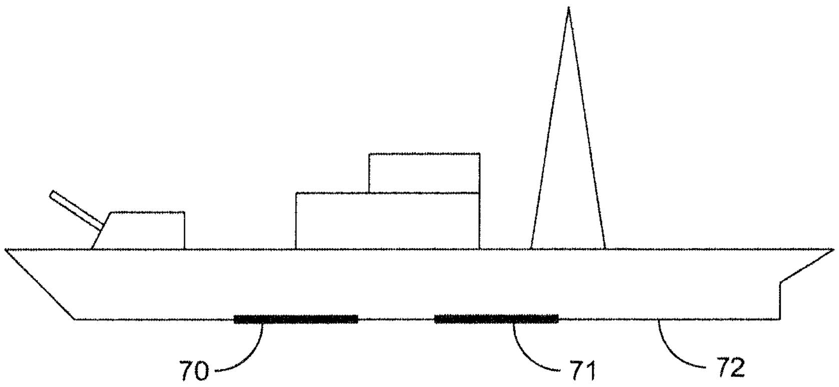
FIGS. 5*a* and 5*b* are side and bottom views respectively of a dual-array installation according to an embodiment of the present invention.
Figure 5B:
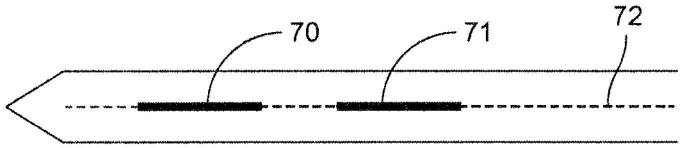

FIGS. 5*a*-7*b* show multiple-array arrangements according to embodiments of the present invention. Particularly, FIGS. 5*a* and 5*b* illustrate two exemplary sonar arrays 70,71 mounted longitudinally along a centerline of a vessel's hull 72. This arrangement provides increased coverage over the single-array arrangements described above, particularly in the longitudinal direction. Segmentation of the arrays 70,71 (as distinct from a single array) may be desired due to, for example, the location own-ship noise sources, the desired sonar coverage range, or the availability of a suitable continuous mounting surface along the length of the hull 72.

Figure 6A:
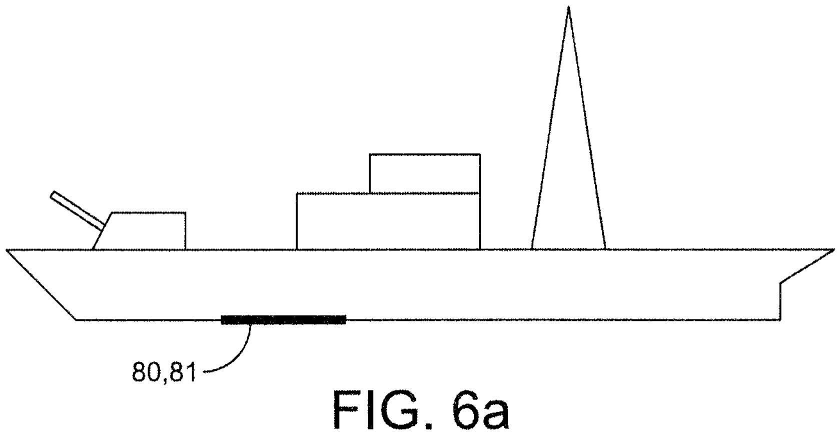
FIGS. 6*a* and 6*b* are side and bottom views respectively of a side by side array installation according to an embodiment of the present invention
Figure 6B:
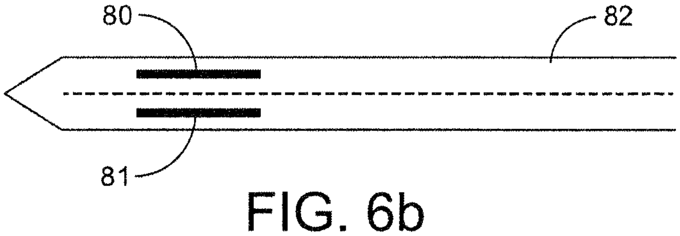

Referring to FIGS. 6*a* and 6*b*, a second dual-array embodiment is shown. In this embodiment, two sonar arrays 80,81 are arranged generally parallel to one another, as distinct from in series along the hull. Specifically, each array 80,81 is arranged offset from, and on opposite sides of a centerline of the vessel's hull 82. This arrangement provides increased sonar coverage in a lateral direction, as well as presents the opportunity to utilize signal cross-correlation to filter out known noise sources.

Figure 7A:
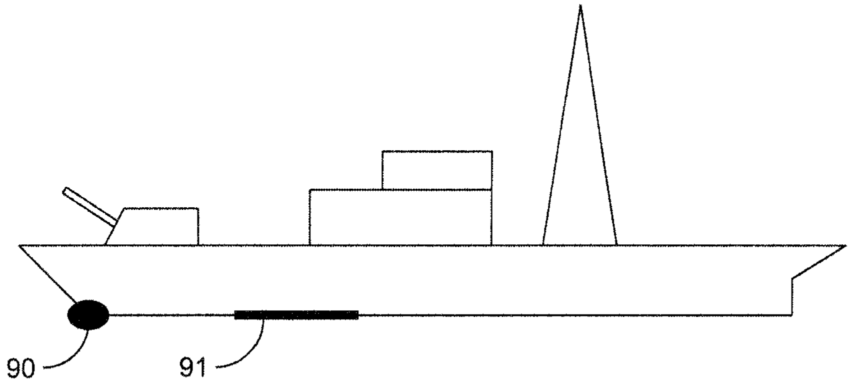
FIGS. 7*a* and 7*b* are side and bottom views respectively of an array installation including the use of a traditional hull mounted array in conjunction with the passive linear array of the present invention.
Figure 7B:
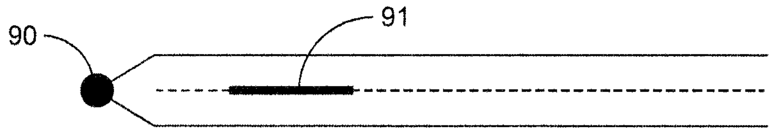

Finally, referring generally to FIGS. 7*a* and 7*b*, it is further envisioned that the passive sonar array 91 of the present invention may be used in conjunction with existing hull-mounted sonar systems, such as a traditional bow-mounted sonar unit 90 in order to provide increased detection capability to the vessel, without the above-described drawbacks of towed-array arrangements.

Figure 8:
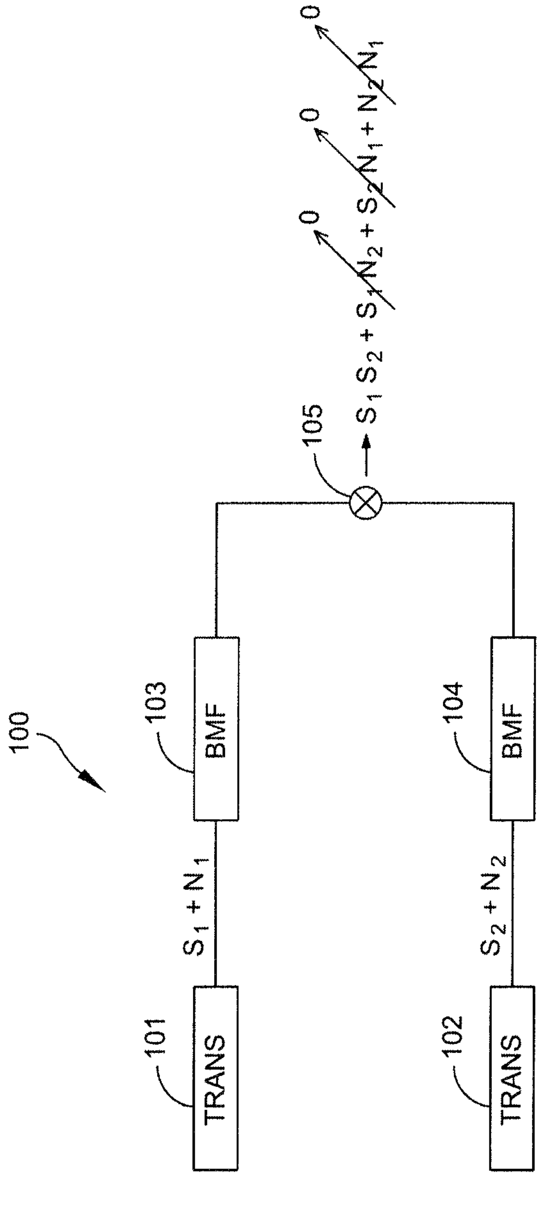
FIG. 8 is a schematic representation of a multi-array sonar system utilizing cross-correlation noise cancellation.

The use of multiple arrays provides additional advantages over single array arrangements. Notably, the use of cross-correlation signal processing techniques may be implemented to increase signal to noise ratios. Referring generally to FIG. 8, a simplified sonar arrangement 100 is provided having first and second sonar arrays 101,102. These arrays 101,102 may comprise two D-shaped arrays, such as those shown in FIGS. 5*a*-6*b*, or a traditional hull-mounted array and a D-shaped array as shown in FIGS. 7*a* and 7*b*. Each of the arrays 101,102 may be coupled to respective beamformers 103,104, for providing return signals S1,S2 having respective noise components N1,N2. The beamformers 103,104 are operative to combine the received return signals to form one or more beams. Each beam is the result of a combination of the output signals of the arrays 101,102, and are arranged according to the direction of the received signals, while signals arriving from other directions are de-emphasized. In this way, the beamformers 103,104 operate as a type of filter to separate the return signal from unwanted noise and interference. The output of the beamformers 103,104 is provided to a cross-correlation module 105. The cross-correlation module 105 utilizes the product of the respective signals to cancel corresponding noise components and output an amplified, filtered signal.

In this way, noise generated from various sources, including known own-ship noise sources may be reduced and array gain improved. Accordingly, in one embodiment of the present invention, each of the first and second arrays 101,102 may be arranged on either side of a known source of own-ship noise, such as an engine or power generator, such that the noise may be effectively filtered from the system. In another embodiment, it is envisioned that the above-described D-shaped sonar array may be retrofitted to a vessel having a pre-existing sonar system in order to improve the vessel's detection capabilities, as well as provide improved noise cancellation to the system as a whole.

While the individual arrays of a multiple-array arrangement may be separated any given distance, in a preferred embodiment of the present invention, the distance should be sufficient such that own ship noise received by each of the arrays is independent, or uncorrelated. It is further noted that the system of FIG. 8 comprises a simplified representation of an exemplary sonar system. Other typical sonar system components, for example, receivers, filters, and other signal processing modules, may be utilized with the system of the present invention.

Although a select number of embodiments are shown, it is envisioned that any arrangement of these arrays may be utilized depending on available suitable hull or keel mounting surfaces, desired operational and performance characteristics, cost considerations, as well as based on the location of vessel-generated noise sources which could cause unwanted interference.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term “invention” merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A hull-mounted sonar system for a marine vessel, the system comprising:

a receiving array comprising at least one hydrophone;

a housing configured to accept the receiving array, the housing comprising a generally D-shaped cross-section, the D-shape cross-section defined by a substantially flat portion having first and second ends, and a substantially curved portion extending from the first end to the second end of the flat portion;

wherein the at least one hydrophone abuts upon the substantially flat portion of the housing; and wherein said substantially flat portion of the housing is configured to be directly attached to a portion of the keel or hull.

2. The system of claim 1, wherein the at least one hydrophone is arranged approximately midway along the length of the flat portion such that the at least one hydrophone is substantially equidistant from any given point along the curved portion.

3. The system of claim 1, wherein the substantially curved portion comprises a constant radius with respect to the at least one hydrophone.

4. The system of claim 1, further comprising a retaining portion formed within the housing, the retaining portioned configured to retain the at least one hydrophone.

5. The system of claim 1, wherein the at least one hydrophone comprises a plurality of hydrophones arranged along a common axis that is parallel to an axis of the keel.

6. The system of claim 1, wherein the flat portion of the housing is configured to be attached to the hull of said vessel.

7. The system of claim 6, wherein the housing is attached to the hull by a marine adhesive or epoxy.

8. The system of claim 1, wherein the housing is attached to the hull by at least one fastener.

9. The system of claim 1, further comprising a second receiving array.

10. The system of claim 9, further comprising a cross-correlation module, the cross-correlation module responsive to signals provided by each of the two receiving arrays and operative to increase signal gain.

11. The system of claim 10, wherein the two receiving arrays are arranged on either side of a known noise source of the marine vessel and the cross-correlation module is further operative to decrease signal noise associated with the known noise source.

12. The system of claim 9, wherein the second receiving array is arranged in a housing having the same D-shaped cross-section as the housing of the first receiving array.

13. The system claim 1, wherein the receiving array is provided with at least one hydrodynamic fairing, the at least one fairing attached to at least one of a leading or a trailing surface of the at least one receiving array.

14. A method of fitting a sonar system to the hull of a vessel, the method comprising:

arranging at least one hydrophone within a D-shaped housing, the D-shaped housing comprising a generally flat portion having first and second ends, and a generally curved portion extending from the first end to the second end, wherein the at least one hydrophone abuts upon the generally flat portion of the housing; and attaching the generally flat portion of the housing directly to the hull of the vessel.

15. The method of claim 14, wherein the step of arranging the at least one hydrophone within the D-shaped housing further comprises securing the at least one hydrophone to an attachment means within the housing.

16. The method of claim 14, wherein the step of arranging the at least one hydrophone within the D-shaped housing further comprises arranging the at least one hydrophone on the substantially flat portion of the housing such that the at least one hydrophone is arranged substantially equidistant from any given point along the curved portion of the housing.

17. The method of claim 14, wherein the step of arranging the at least one hydrophone within the housing further comprises arranging a plurality of hydrophones along a common axis within the housing that is parallel to an axis of the keel.

18. The method of claim 14, wherein the step of attaching the housing to the hull of a vessel comprises attaching the housing to the hull using an adhesive.

19. A method for cancelling noise from received sonar signals, the method comprising the steps of:

attaching a plurality of hydrophones arranged along a common axis parallel to the axis of a keel within a D-shaped housing to the hull of a vessel equipped with a pre-existing sonar system such that a generally flat portion of the D-shaped housing is directly attached to the hull and the plurality of hydrophones abut upon the generally flat portion of the housing, and cross-correlating signals received from the plurality of hydrophones and the pre-existing sonar system such that at least one of the noise of the received signals is reduced and the gain of the received signal is increased.

* * * * *